Patented Jan. 21, 1936

2,028,383

UNITED STATES PATENT OFFICE 2,028,383

CHLORINATION OF PHTHALIC ANHYDRIDE

Michael N. Dvornikoff, St. Louis, Mo., assignor to Monsanto Chemical Company, St. Louis, Mo., a corporation of Delaware No Drawing. Application June 12, 1933,
Serial No. 675,463

5 Claims. (Cl. 260—123)

This invention relates to the manufacture of chloro-derivatives of phthalic anhydride and it deals more particularly with a method of direct chlorination of the anhydride with elemental chlorine.

Heretofore various methods for the manufacture of tetrachlorophthalic acid or its anhydride have been proposed. One such method consists in reacting phthalic anhydride with chlorine in the presence of a relatively large quantity of antimony pentachloride. (German Patent 32,564). Another method which has been proposed involves chlorinating the phthalic anhydride mixed with oleum of 50%–60% content and containing a small amount of iodine. (German Patent 50,177). More recently it has been proposed that the phthalic anhydride be nitrated first and subsequently chlorinated, the nitro derivative being more readily susceptible to chlorination than the anhydride itself. (British Patent 359,165).

I have now found that one can obtain practically quantitative yields of tetrachlorophthalic anhydride by the direct chlorination of molten phthalic anhydride in the presence of a ferric salt or metallic iron as catalyst.

The following specific examples illustrate the application of the principles of my invention:

A mixture of 70 parts of phthalic anhydride and approximately 1 part of ferric chloride is heated to a temperature which is at least high enough to flux the anhydride. The preferred temperature condition is one which is as high as practicable in view of the mechanical difficulties introduced by reason of sublimation of the anhydride. The temperature is raised advantageously as the chlorination proceeds since the reaction mixture has less tendency to sublime as the quantity of tetrachlorophthalic anhydride in the reaction mixture increases. The following temperature conditions and time of reaction have been found to give satisfactory results, the chlorine being supplied by bubbling the gas through the molten mixture.

| Temperature | Duration |
|---|---|
| Degrees centigrade | Hours |
| 160–170 | 12 |
| 170–210 | 12 |
| 210–230 | 20 |
| 230–260 | 21 |
| 260 | 7 |

Toward the end of the reaction cycle the chlorination becomes sluggish particularly if less than the prescribed amount of catalyst is employed. At the end of the 72 hour reaction period the mixture will be found to have increased in weight approximately the theoretical amount for the quantitative formation of the tetrachlorophthalic anhydride. Thereafter the reaction mixture is poured into a pan and permitted to cool after which it is broken into pieces and dissolved in an aqueous solution of soda ash. The iron is thereby precipitated and removed by filtration. Subsequently the tetrachlorophthalic acid is precipitated by acidification with a mineral acid. The product so produced is converted to the anhydride conveniently by application of heat.

If phthalic anhydride containing a ferric salt, as for example $FeCl_3$, is chlorinated until the increase in weight is equivalent to one mol. equivalent of chlorine and the reaction product is distilled, the monochloro derivatives of phthalic anhydride are obtained in 75% yield. Continued chlorination of the monochlorophthalic anhydride results in di- and trichloro derivatives which may be recovered by fractional distillation.

It is to be understood, of course, that in lieu of the ferric chloride prescribed one may add iron filings or iron compounds other than ferric chloride, such as ferrous or ferric sulphate, ferrous chloride and others. Similarly, the precise temperature conditions prescribed may be varied and the duration of the chlorination by appropriate adjustment of the tempertaure, conditions of contact between the chlorine and the phthalic anhydride may be practiced as is well understood by those skilled in the art.

What I claim is:

1. A method of chlorinating phthalic anhydride which consists in introducing elemental chlorine into molten phthalic anhydride containing an iron salt of a non-oxidizing, strong mineral acid as a chlorinating catalyst.

2. A method of manufacturing tetrachlorophthalic anhydride which comprises chlorinating phthalic anhydride with elemental chlorine in the presence of an iron salt of a non-oxidizing, strong mineral acid catalyst.

3. The method as defined in claim 2 and further characterized in that the temperature of the reaction mixture is increased progressively as the reaction proceeds.

4. The method of chlorinating phthalic anhydride which consists in introducing elemental chlorine into molten phthalic anhydride containing a chlorinating catalyst consisting of ferric chloride.

5. The method of chlorinating phthalic anhydride which consists in introducing elemental chlorine into molten phthalic anhydride containing a chlorinating catalyst consisting of a chloride of iron.

MICHAEL N. DVORNIKOFF.